United States Patent [19]

Smith

[11] Patent Number: 5,437,354
[45] Date of Patent: Aug. 1, 1995

[54] TILT CONTROL APPARATUS FOR VEHICLES

[76] Inventor: Stewart G. Smith, Cloud Farm - Nine Gates Rd., Yorklyn, Del. 19736

[21] Appl. No.: 195,903

[22] Filed: Feb. 10, 1994

Related U.S. Application Data

[63] Continuation of Ser. No. 89,238, Jul. 12, 1993, abandoned.

[51] Int. Cl.$^6$ ............................................. F16F 9/46
[52] U.S. Cl. .............................. 188/299; 188/322.13; 280/840
[58] Field of Search ................... 188/299, 300, 322.13, 188/322.14, 275, 279, 280, 313, 314, 315, 316, 318; 280/714, 703, 709, 772, 840, 112.2, 112.1, 707, 6.12; 267/64.12, 183-194; 340/440, 539, 689; 200/61.52

[56] References Cited

U.S. PATENT DOCUMENTS

| | | | |
|---|---|---|---|
| 1,281,079 | 10/1918 | Sears | 188/275 |
| 1,415,820 | 5/1922 | Eynon . | |
| 2,507,276 | 5/1950 | Skwaryk | 188/299 |
| 2,698,068 | 12/1954 | Hein | 188/299 |
| 2,779,587 | 1/1957 | Thomas | 267/186 |
| 2,877,872 | 3/1959 | Krizan | 188/275 |
| 2,897,613 | 8/1959 | Davidson et al. | 188/300 X |
| 2,901,241 | 8/1959 | Lautzenhiser et al. | 267/186 |
| 2,934,353 | 4/1960 | D'Avigdor | 280/112.2 |
| 2,934,354 | 4/1960 | Vogel . | |
| 2,954,237 | 9/1960 | Sampietro | 280/703 |
| 2,976,052 | 3/1961 | Hanna | 188/275 X |
| 3,008,729 | 11/1961 | Muller et al. | 280/112.2 |
| 3,026,125 | 3/1962 | Vogel | 280/714 |
| 3,142,363 | 7/1964 | Tamini | 188/300 |
| 3,269,685 | 8/1966 | Wallace . | |
| 3,559,776 | 2/1971 | Schultze | 188/300 X |
| 3,770,292 | 11/1973 | Palazzetti | 280/6.12 X |
| 3,820,809 | 6/1974 | Blonar . | |
| 3,885,809 | 5/1975 | Pitcher . | |
| 4,152,004 | 5/1979 | Schröder | 280/6.12 X |
| 4,333,668 | 6/1982 | Hendrickson et al. | 280/703 |
| 4,345,661 | 8/1982 | Nishikawa . | |
| 4,506,751 | 3/1985 | Stephens | 280/703 |
| 4,737,759 | 4/1988 | Stropkay et al. . | |
| 4,752,062 | 6/1988 | Domenichini | 188/299 |
| 4,966,390 | 10/1990 | Lund . | |
| 5,054,813 | 10/1991 | Kakizaki . | |
| 5,090,770 | 2/1992 | Heinrichs et al. | 267/64.12 X |

Primary Examiner—Douglas C. Butler
Attorney, Agent, or Firm—Herbert M. Wolfson

[57] ABSTRACT

In a vehicle having a transverse axle and a body, and a shock absorber mounted between the axle and the body to absorb shock from vertical movement of the axle and prevent shock from being transmitted completely to the body, the improvement disclosed involves apparatus for sensing tilt of the axle in combination with separate hydraulic system to prevent further tilt of the axle beyond a predetermined point sensed by the sensing unit.

16 Claims, 3 Drawing Sheets

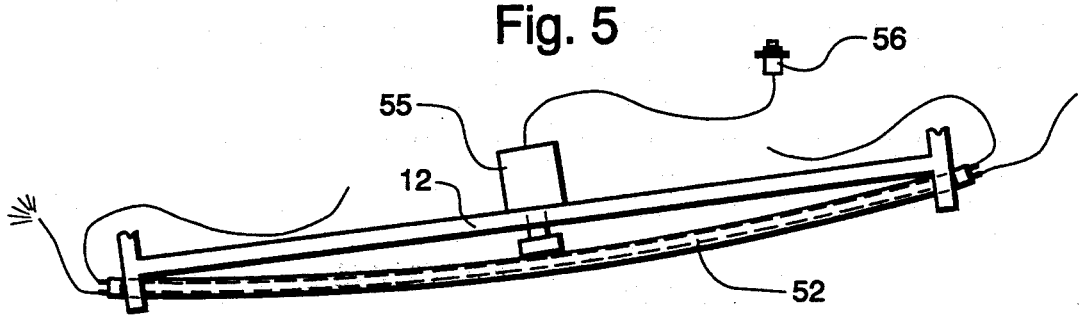
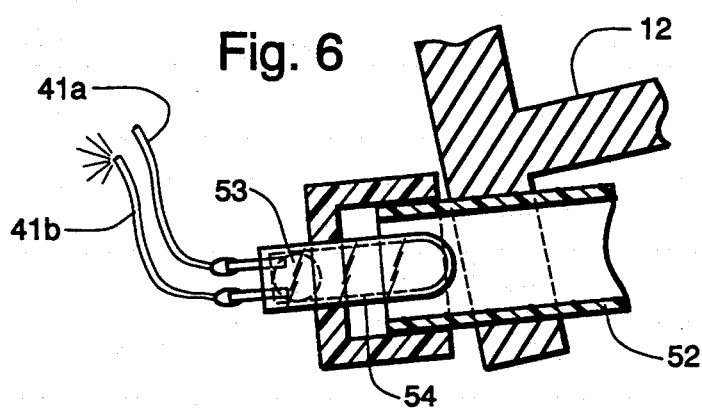
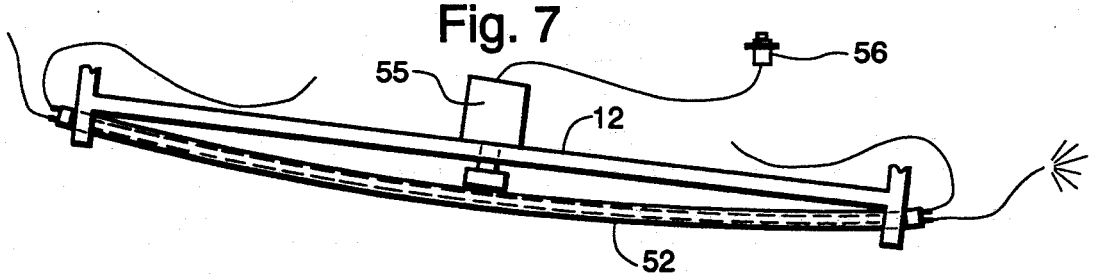
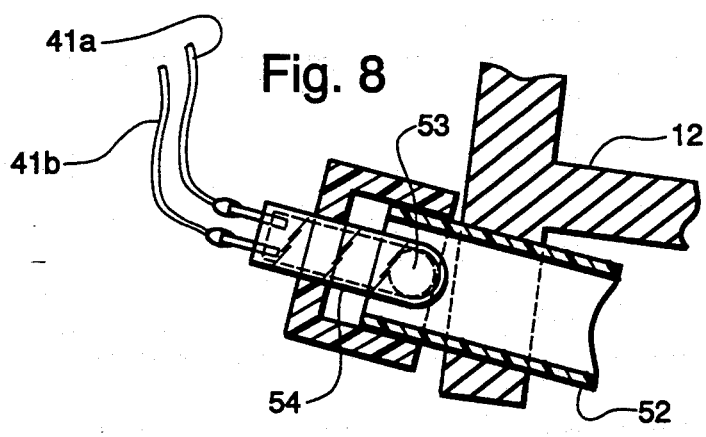

TILT CONTROL APPARATUS FOR VEHICLES

This application is a continuation, of application Ser. No. 08/089,238, filed Jul. 12, 1993 now abandoned.

FIELD OF THE INVENTION

The present invention relates to a suspension control system for automotive and railroad vehicles and the like. More particularly, the invention relates to a technology for suppressing vehicular rolling motion, i.e. the tendency of the vehicle to tilt when the vehicle turns a corner or is driven around a sharp curve, without destroying the comfortable ride provided by the conventional spring and shock absorber systems that compensate for the rapid upward and downward movements encountered when the vehicle travels over rough roads.

DESCRIPTION OF THE BACKGROUND ART

As shown in the prior art, the conventional spring and shock absorber system is used in automobiles to reduce shock or concussion when the vehicle strikes a bump or, in general, when the movement of the vehicle(s) over a roughness in the surface of the road moves the auto's axle(s) along with the wheel(s) movement. The shock absorber is mounted between the automobile frame and the axles. It consists of a piston inside a fluid-filled cylinder. When the wheel hits the bump, instead of the axle communicating the shock directly to the automobile frame, the piston is pushed upwardly and the fluid in the cylinder resists the movement of the piston thus offsetting the force of the bump. The hydraulic fluid, rather than the frame, absorbs the shock. The ease with which the piston can compress the fluid determines the so-called "hardness" of the ride.

When a vehicle turns, the suspension permits the vehicle body to rotate slightly about its longitudinal axis in response to the rolling force exerted on the body during the turn. Typically, vehicle passengers experience this effect as a tilt of the vehicle body, with the side of the body on the outside of the curve being relatively lower than the side of the body on the inside. Further, the vehicle body tends to pitch forward so that the front of the body is relatively lower than the rear. The pitch and roll combine to incline the vehicle body toward the front corner on the outside of the turn.

The prior art is replete with anti-roll systems that may be added to the conventional shock absorber systems. In general, these systems are complex requiring several additional pieces of equipment in a space that is already crowded. They counteract vehicle roll by providing lifting forces acting between the vehicle body and suspension on the outside of the curve or by providing a vehicle lowering force acting between the body and suspension on the inside turn side of the vehicle. Some anti-roll systems in the art provide complementary lifting and lowering forces simultaneously with the accompanying array of equipment.

A typical tilt or sway control apparatus is shown in U.S. Pat. No. 2,934,353 issued in 1960 to L.B. d'Avigdor. In this apparatus, the inventor provides at each side of the vehicle, between the axle and the body, a body raising and lowering motor device including an expansible pneumatic chamber and means for supplying air to and discharging it from the chamber to regulate the volume of the chamber. This air supply and exhaust means is controlled by means of electrically operated valves in response to an electrically operated switch mechanism. The switch mechanism responds to centrifugal force and to gravity, and is thus affected by both tilting and lateral acceleration of the vehicle.

It is an object of the present invention to provide an improved tilt control apparatus, improved over the prior art in both effectiveness and in simplicity.

It is a further object to provide such apparatus that will not affect the vehicle body when the vehicle is subjected to roughness in the road, i.e. an apparatus that will not interfere with the vehicle's conventional shock absorber system.

SUMMARY OF THE INVENTION

The present invention provides a relatively simple, but effective sensing unit-tilt controller combination in a moving vehicle that permits the shock absorber system to insulate the body (and the passengers therein) against the sharp upward and downward movement due to road roughness on the straightaway, but the tilt or sway of the body will be controlled when the sensing unit "senses" excessive lateral acceleration due to an excessive angular tilt in the road or movement around a curve when the vehicle sways to the outside.

Specifically, in a vehicle having a transverse axle and a body, below which the axle is attached, the novel tilt controller is mounted between the axle and the body and comprises (1) means for sensing the tilt of the axle and the body or frame attached thereto as the axle and the body are tilted, in combination with (2) tilt controlling means mounted between the axle and the body for controlling the tilt of the vehicle so that as the tilt of said axle increases beyond a predetermined amount, the sensing means is activated to send a signal to the tilt controlling means so that further tilt of the body or frame of the vehicle is prevented.

The preferred sensing mechanism is a mercury "switch". The switch may include a tube in the shape of a wide shallow U, a pool of mercury within the tube and two sets of contacts at the opposite ends of the tube to be engaged by the mercury. The tube is mounted crosswise of the vehicle.

Alternatively, the switch may employ two balls of mercury, each within a glass envelope at each end of the U-shaped tube. Each ball is adapted to engage the set of electrical contacts at the ends of the tube when the tube tilts in its direction.

In a preferred embodiment, the curvature of the U-shaped tube (and hence the sensitivity of the tilt controller) may be adjusted by an automated screw or similar mechanism located substantial at the center and which can be controlled by the driver of the vehicle.

The sensing unit may also be composed of a cylindrical tube with a ball bearing free to roll within the tube. The tube is similarly affixed to the bottom of the body or axle of the vehicle across its width. The tube is crimped, but not completely, at two points, one to the right of the center of the tube and one to the left, predetermined to maintain the center of gravity of the vehicle at a position that will maintain the stability of the vehicle.

The crimped portions, as the contacts in the previously described mercury switch, are each parts of two electrical circuits adapted to control the opening and closing of a valve in each of the tilt controllers. When the vehicle's body and axle tilt, the ball bearing moves in the direction of the tilt to the crimped portion to complete the electrical circuit at the crimped portion. The electric current in the completed circuit activates a switch that causes a valve in the associated tilt controller to close, thus preventing egress of hydraulic fluid and any further compression of fluid in the tilt controller. Thus, tilting to an unsafe level is prevented.

The tilt controller, which actually limits the swaying or tilting movement of the vehicle comprises, on at least one side of the vehicle, hydraulic means consisting essentially of a chamber partially filled with fluid; a movable piston sealing the lower end of the chamber, integral with or attached to the transverse axle; the upper end of the chamber being closed and attached to or integral with the frame or body of the vehicle; a plate within the chamber having a substantially central opening and so placed as to separate the fluid within the chamber into a lower portion and an upper portion; a movable sealing means or shut-off valve within the chamber adapted, when activated, to seal the central opening; means for moving the sealing means or valve into the closed position; means for sensing the tilting movement of said vehicle, (as previously described) electrically connected to the means for moving the sealing means whereby the sealing means is moved into the closed position when the sensing means is activated at a predetermined tilt position of the axle to prevent flow of the fluid from the lower portion of the chamber into the upper portion of the chamber and, thus, prevent further tilting of the frame or body of the vehicle.

The apparatus, as defined above, preferably includes electromagnetic means and a spring assembly for operating the valve. An electrical switch controlled by the tilt of the sensing means and the movement of the electrically conductive material within the sensing means serves to energize the electromagnetic valve-operating means.

BRIEF DESCRIPTIONS OF THE DRAWINGS

Figure 3:
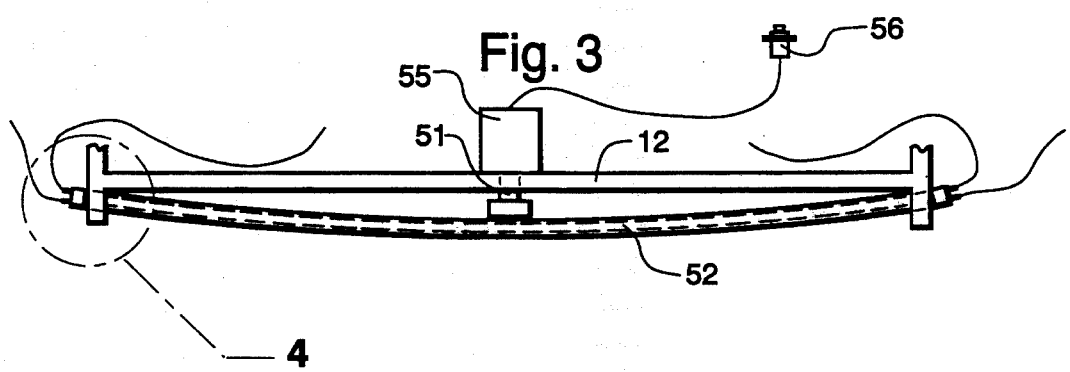
Figure 4:
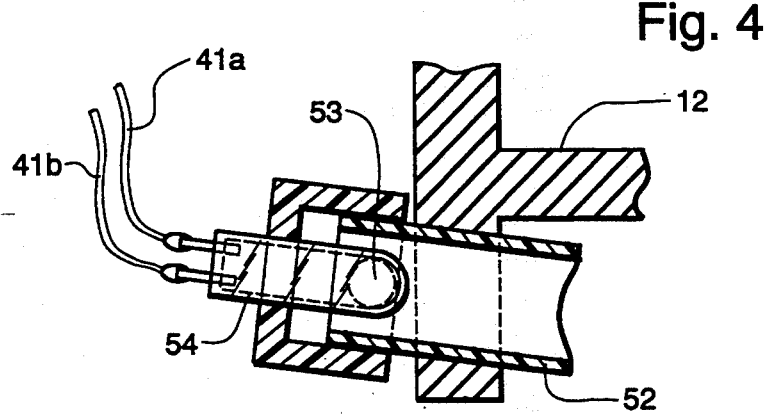

FIGS. 3, 5 and 7 are elevational views of one embodiment of a sensing device of the invention utilizing a curved cylindrical tube containing the mercury switch in three positions; FIG. 3, when the body of the vehicle is level; FIG. 5, when it tilts to the left; and FIG. 7, when it tilts to the right;

FIG. 4, 6 and 8 are enlarged detail sectional views of the mercury switch; FIG. 4 shows the position of the switch at the left when the vehicle is level; FIG. 6, the position when the vehicle tilts or leans to the left; and FIG. 8, when the vehicle tilts to the right.

DETAILED DESCRIPTION

Figure 1:
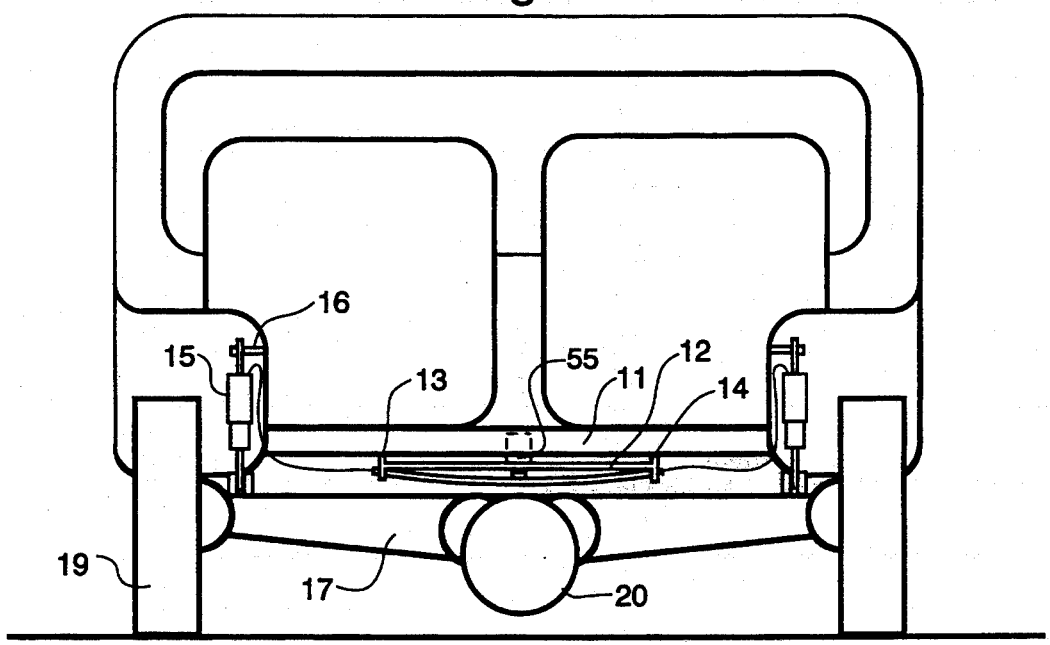
FIG. 1 is a cross-sectional view, somewhat diagrammatic, showing a vehicle equipped with the sensing unit and the tilt controller.

In FIG. 1, a schematic cross-section of the vehicle through one axle, the sensing unit 12 of the invention is shown attached to the body or frame of the vehicle 11 at positions 13 and 14. The tilt controller or stabilizer 15 is connected to the body 11 at position 16 and to the axle 17 at position 18.. Connection may be accomplished by welding or by mechanical connectors, e.g. screws, bolts, etc. The wheels 19 are shown mounted on either end of axle 17 and connected to the vehicle's body 11 through conventional suspension means, not shown. The differential for axle 17 is shown at 20.

Figure 2:
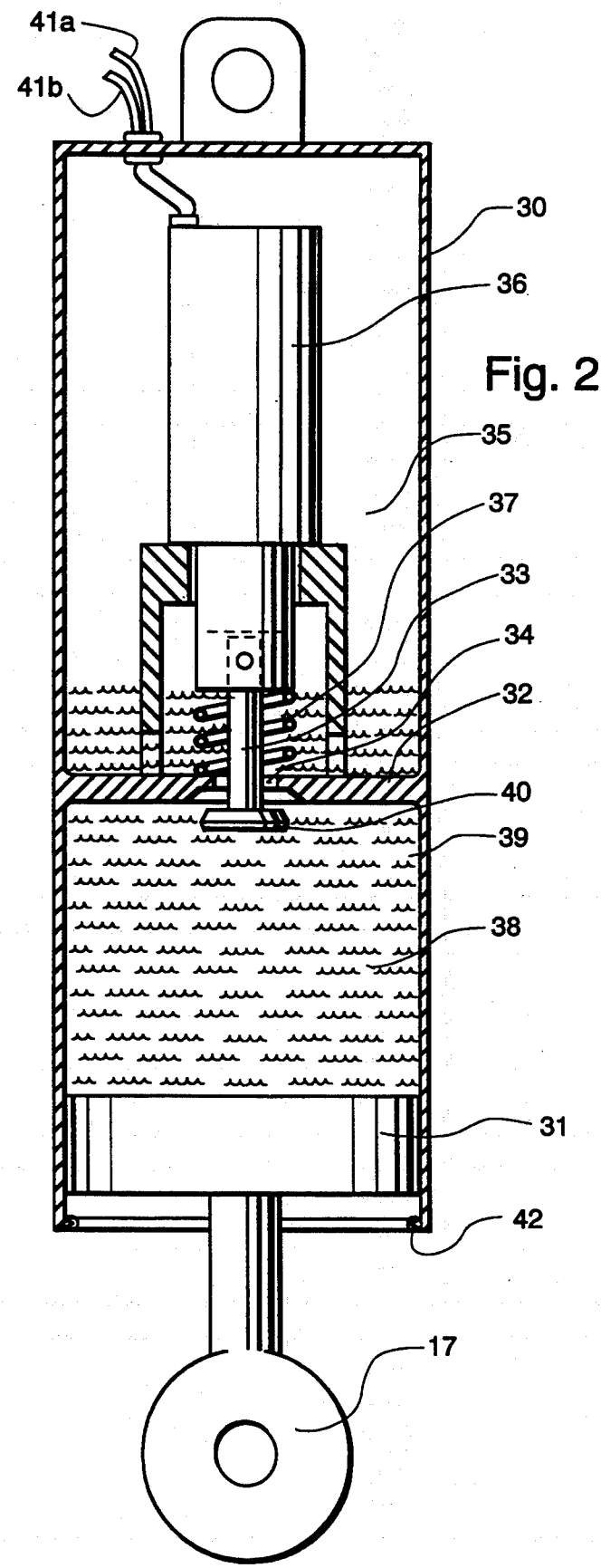
FIG. 2 is a vertical-sectional detail of a preferred embodiment of the tilt controller or dampening unit.

The tilt stabilizer 15, one for each side of the vehicle, is shown in cross-sectional detail in FIG. 2. The stabilizer 15 is housed in casing 30. It is composed of a piston 31 within the casing, attached to the axle 17 below. Hydraulic fluid 38 is located within a chamber 39 above the piston 31. When the vehicle hits a bump in the road, the fluid is forced past the lockplate 32 through the opening 34. A seal 40, attached to a separate piston 33, does not close opening 34 since solenoid 36 is not activated when only a bump is encountered and there is no tilting of the vehicle. The hydraulic fluid 38 passes through the opening 34 into a reservoir chamber 35. Within the reservoir chamber, the solenoid device 36 is attached to the lockplate 32. The solenoid has a spring assembly 37 anchored to the back of the lockplate 32 and the solenoid's electrical wiring 41a and 41b communicates with the mercury switch of the sensing unit. The strength to cause blockage of fluid flow inures to the lockplate 32. Since the seal 40 is opened and the opening is quite large there is no resistance to compression or fluid flow when encountering a bump.

However, when tilting or unusual lateral acceleration is encountered, the sensing unit will activate the solenoid 36 and cause the seal 33 to close the opening 34 in the lockplate 32. No fluid then can flow from the lower chamber 39 into the reservoir chamber 35. This prevents any further downward movement or tilting of the body of the vehicle.

As stated previously, the body of the vehicle 11 is moved up and down by the jarring action of the axle 17. The action, after being transmitted through the conventional shock absorber system, not shown, is not sharp enough to upset the passengers within the vehicle nor sufficiently angular to activate the sensing unit of the tilt controller.

However, as axle 17 is tilted more and more by the tilt in the road or by the lateral acceleration of the vehicle around a curve in the road, the axle 17 forces the piston 31 deeper and deeper into the primary cylinder or lower chamber 39 with more and more fluid 38 flowing through opening 34 into overflow reservoir 35. The tilt of the body 11 approaches closer and closer to the tilt of the axle 17; and ultimately may shift the center of gravity of the vehicle, particularly for heavy trucks or vehicles carrying heavy loads, into an unstable position if not for the tilt controller 15.

The tilt controller, shown at 15, electrically combined with the sensing device shown in FIGS. 3, 5, and 7, prevents the shift of the center of gravity from becoming uncomfortable or, possibly, fatal. Basically, the solenoid 36, activated by the electrical circuit which in turn was activated by the mercury switch, as shown in FIG. 6, serves to seal the opening 34 at a predetermined point in the tilting of the vehicle. This closure prevents any further flow of fluid 38 into reservoir 35; and also prevents any further tilt of body. Basically, the piston 31, which is now unable to move upwardly, restrains any further tilt of the body of the vehicle instantaneously with no delay as would be expected if a motor had to pump against this force of compression. Furthermore, the hydraulic fluid does not compress as air or gas would.

The solenoid device 36 is composed of a rod or piston 33 that fits within the solenoid 36. It is usually spring loaded and attached to the lockplate 32 as shown in FIG. 2. The solenoid 36 is connected to the vehicle's electrical circuit through wires or other electrical connectors 41a and 41b, one to the vehicle's battery and the other to the sensing device 12, shown in greater detail in FIGS. 3, 5 and 7.

As shown in FIG. 3, the sensing unit 12 is composed of a cylindrical tube 52, usually non-electrically conductive plastic, but may be metallic, e.g. copper, steel, aluminum, or the like, the inner surface being coated with an insulating material. The tube 52 is mounted transversely and substantially parallel to axle 17 and attached, with bolts or other means to the frame or body 11 of the vehicle. The tube 52 although "substantially" parallel to the axle is formed as a shallow "U" with an adjustment screw 51 at about the half-way point of its length to permit changes in the sensitivity of the sensing unit 12, as desired. At each end of tube 52 are mercury switches, each of which contains a ball of mercury 53 within a glass envelope 54. Each switch is electrically connected to the respective solenoids 36 associated with the tilt stabilizers 15 at each wheel and the vehicle's battery through conducting wires 41a and 41b.

In a most desirable embodiment, means may be provided within the interior of the vehicle by which the driver is able to control the sensitivity of the sensing unit-tilt controller combination. Specifically, as shown in FIG. 3 the adjustment screw 51, or any other equivalent means movable up and down and adapted to control the curvature of U-shaped tube 50, may be moved by motor 55. The action of motor 55 is, in turn, controlled by an interior switch, diagrammically shown at 56, which may be easily activated by the driver in anticipation of hazardous road conditions.

In any event, when the vehicle tilts sufficiently to the left, as shown in FIGS. 5 and 6, the ball 53 in the switch on the left rolls to the left to complete the electrical circuit to the tilt controller or stabilizer 15 on the left side of the vehicle. Solenoid 36 is activated and the spring biased valve shuts off flow of hydraulic fluid from the primary cylinder to the reservoir; and further downward movement of the left side of the body 12 is prevented. When the vehicle returns to its normal position, the ball 53 rolls from its contact with wires 41a and 41b to its normal position. The hydraulic pressure combined with the expansion of the spring 37 (due to release of the compressive force from the solenoid) then permits the seal 33 to pull away from lock plate 32 allowing fluid 38 to again flow freely through opening 34.

The foregoing series of operations occur for tilting of the vehicle to the right, as shown in FIGS. 7 and 8. The electrical circuit is completed through the mercury switch positioned at the right, which activates the solenoid and closes the valve in stabilizer 15 on the right side of the vehicle.

In further improvement, the tilt controller 15 is modified to function as both a shock absorber and a tilt controller or stabilizer. In this embodiment, the lockplate 32 becomes a lockplate assembly that is movable vertically within casing 30 instead of being fixed to the inside of casing 30 as in FIG. 2; and the assembly functions as a piston. The movable assembly includes, besides lockplate 32, the solenoid and spring assembly, and is also attacked to the vehicle's body 12 above. The opening 34 can be adjusted in size to provide shock absorption. The smaller the opening, the more resistance to fluid flow into the reservoir chamber above 35. If a bump is encountered, the hydraulic fluid in the lower portion is compressed by the movement of the body 12 down and the axle 17 up and flows through the opening 34 into the reservoir chamber 35. As it is met with resistance, cushioning occurs. Should a tilt be encountered as a car goes around a turn the sensor will activate the solenoid 36 which will close the seal 40 so that there is no longer any opening in the piston assembly and lockplate 34. Fluid in the bottom chamber can then no longer enter the upper chamber and movement of the body 12 downwardly is prevented.

While I have shown and described the preferred embodiments of my invention, other modifications may occur to those skilled in the art. Therefore, I intend that my invention be limited only by the claims which follow.

What is claimed is:

1. In a vehicle having an interior and an exterior, a transverse axle and a body, and being subject to swaying and tilting when the vehicle turns a corner or is driven around a curve, the improvement which comprises an apparatus for limiting the swaying and tilting movement of said vehicle comprising, on at least one side of the vehicle, a chamber partially filled with hydraulic fluid and having an upper end and a lower end; a movable piston sealing the lower end of said chamber, attached to said transverse axle; the upper end of the chamber being closed and attached to said body of the vehicle; a plate within said chamber having a substantially central opening separating said fluid within the chamber into a lower portion and an upper portion; movable sealing means within said chamber and when activated seals said central opening; means for moving the sealing means to seal said opening; means for sensing the tilting movement of said vehicle, electrically combined with means for moving the sealing means to seal said opening when the sensing means is activated at a predetermined tilt position of the body to prevent flow of said fluid from the lower portion of the chamber into the upper portion of the chamber and thus prevent tilting of the frame or body of the vehicle.

2. Apparatus as in claim 1 wherein an electrical switch controlled by the tilt of said sensing means is included for energizing electromagnetic means to move said sealing means to seal said opening.

3. Apparatus as in claim 1 comprising chambers partially filled with hydraulic fluid on both sides of the vehicle.

4. Apparatus as in claim 3 including electromagnetic means for operating said sealing means within each chamber and means including an electrical switch controlled by the tilt of said sensing means for energizing said electromagnetic means.

5. Apparatus as in claim 1 where the means for sensing the tilting movement of the vehicle is a horizontal tube transverse to and attached to the body of the vehicle and containing electrically conductive material adapted to flow within the tube depending on the tilt of the vehicle and to complete an electrical circuit at each end of the tube.

6. Apparatus as in claim 5 wherein the curvature of the tube is adjustable by vertical movement of a solid object against the horizontal tube.

7. Apparatus as in claim 6 wherein said solid object is an adjustable screw adapted to press against said tube, the vertical movement of said screw being controlled by a motor electrically activated by a switch in the interior of the vehicle.

8. Apparatus for a vehicle having a transverse axle and a body comprising, on at least one side of the vehicle, a chamber partially filled with hydraulic fluid and a movable piston at one end of said chamber, attached to said transverse axle; the other end of the chamber being attached to said body of the vehicle; a plate within said chamber having at least one opening separating the fluid within the chamber into two portions; movable sealing means within said chamber when activated seals, said at least one opening; means for moving the sealing means to seal said opening; means for sensing the tilting movement of said vehicle, combined with means for moving the sealing means to seal said opening when the sensing means is activated at a set tilt position of the body to prevent flow of said fluid from one portion of the chamber into the other portion of the chamber and thus prevent tilting of the body of the vehicle.

9. Apparatus as in claim 8 wherein an electrical switch controlled by the tilt of said sensing means is included for energizing electromagnetic means to move said sealing means to seal said opening.

10. Apparatus as in claim 8 comprising chamber partially filled with hydraulic fluid on both sides of the vehicle.

11. Apparatus as in claim 10 wherein an electrical switch controlled by the tilt of said sensing means is included for energizing electromagnetic means to move said sealing means to seal said opening.

12. Apparatus as in claim 8 where the means for sensing the tilting movement of the vehicle is a horizontal tube transverse to and attached to the body of the vehicle and containing electrically conductive material adapted to flow within the tube depending on the tilt of the vehicle and to complete an electrical circuit at each end of the tube.

13. Apparatus as in claim 12 wherein the curvature of the tube is adjustable by vertical movement of a solid object against the horizontal tube.

14. Apparatus as in claim 13 wherein said vehicle has an interior and an exterior and said solid object is an adjustable screw adapted to press against said tube, the vertical movement of said screw being controlled by a motor electrically activated by a switch in the interior of the vehicle.

15. Apparatus as in claim 12 wherein completion of said electrical circuit at each end of the tube is accomplished through a mercury switch.

16. Apparatus for a vehicle having at least the following two structural elements, a transverse axle and a body comprising, on at least one side of the vehicle, means comprising a chamber having two portions partially filled with hydraulic fluid; a movable piston at one end of and within said chamber and attached to one of said structural elements; the other end of the chamber being attached to the other of said structural elements of the vehicle; means within said chamber to separate said fluid within the chamber into two portions; means for sensing the tilting of one of said structural elements toward said other structural element; sealing means within said chamber and, when activated by said means for sensing tilting, to prevent any flow of said fluid from one portion to the other portion of the chamber, and, thus, prevent tilting of one of said structural elements toward said other structural element.

* * * * *

US005437354C1

(12) EX PARTE REEXAMINATION CERTIFICATE (10022nd)

United States Patent
Smith

(10) Number: US 5,437,354 C1
(45) Certificate Issued: Feb. 10, 2014

(54) TILT CONTROL APPARATUS FOR VEHICLES

(75) Inventor: Stewart G. Smith, Yorklyn, DE (US)

(73) Assignee: Cloud Farm Associates, Yorklyn, DE (US)

Reexamination Request:
No. 90/012,724, Nov. 21, 2012

Reexamination Certificate for:
Patent No.: 5,437,354
Issued: Aug. 1, 1995
Appl. No.: 08/195,903
Filed: Feb. 10, 1994

Related U.S. Application Data

(63) Continuation of application No. 08/089,238, filed on Jul. 12, 1993, now abandoned.

(51) Int. Cl.
*F16F 9/46* (2006.01)

(52) U.S. Cl.
USPC ............... 188/266.1; 188/299.1; 188/322.13; 280/124.106; 280/124.112

(58) Field of Classification Search
USPC ............... 188/299.1, 322.13, 322.14, 315; 280/124.104, 124.106, 124.113, 777; 267/221, 226
See application file for complete search history.

(56) References Cited

To view the complete listing of prior art documents cited during the proceeding for Reexamination Control Number 90/012,724, please refer to the USPTO's public Patent Application Information Retrieval (PAIR) system under the Display References tab.

*Primary Examiner* — Matthew C. Graham

(57) ABSTRACT

In a vehicle having a transverse axle and a body, and a shock absorber mounted between the axle and the body to absorb shock from vertical movement of the axle and prevent shock from being transmitted completely to the body, the improvement disclosed involves apparatus for sensing tilt of the axle in combination with separate hydraulic system to prevent further tilt of the axle beyond a predetermined point sensed by the sensing unit.

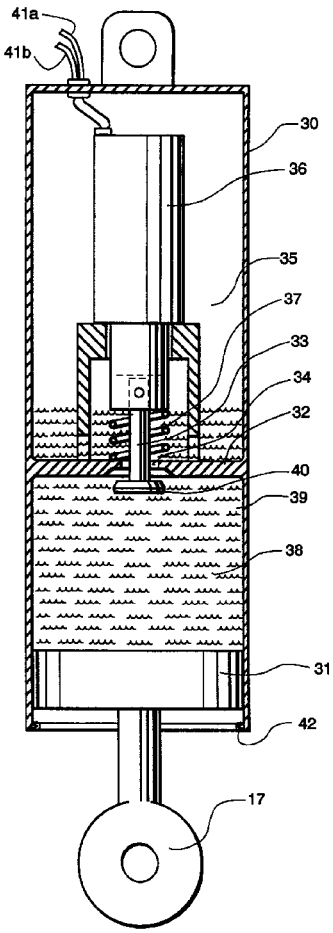

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-5, 8-12, 15 and 16 is confirmed.

Claims 6, 7, 13 and 14 were not reexamined.

* * * * *